Patented Oct. 21, 1924.

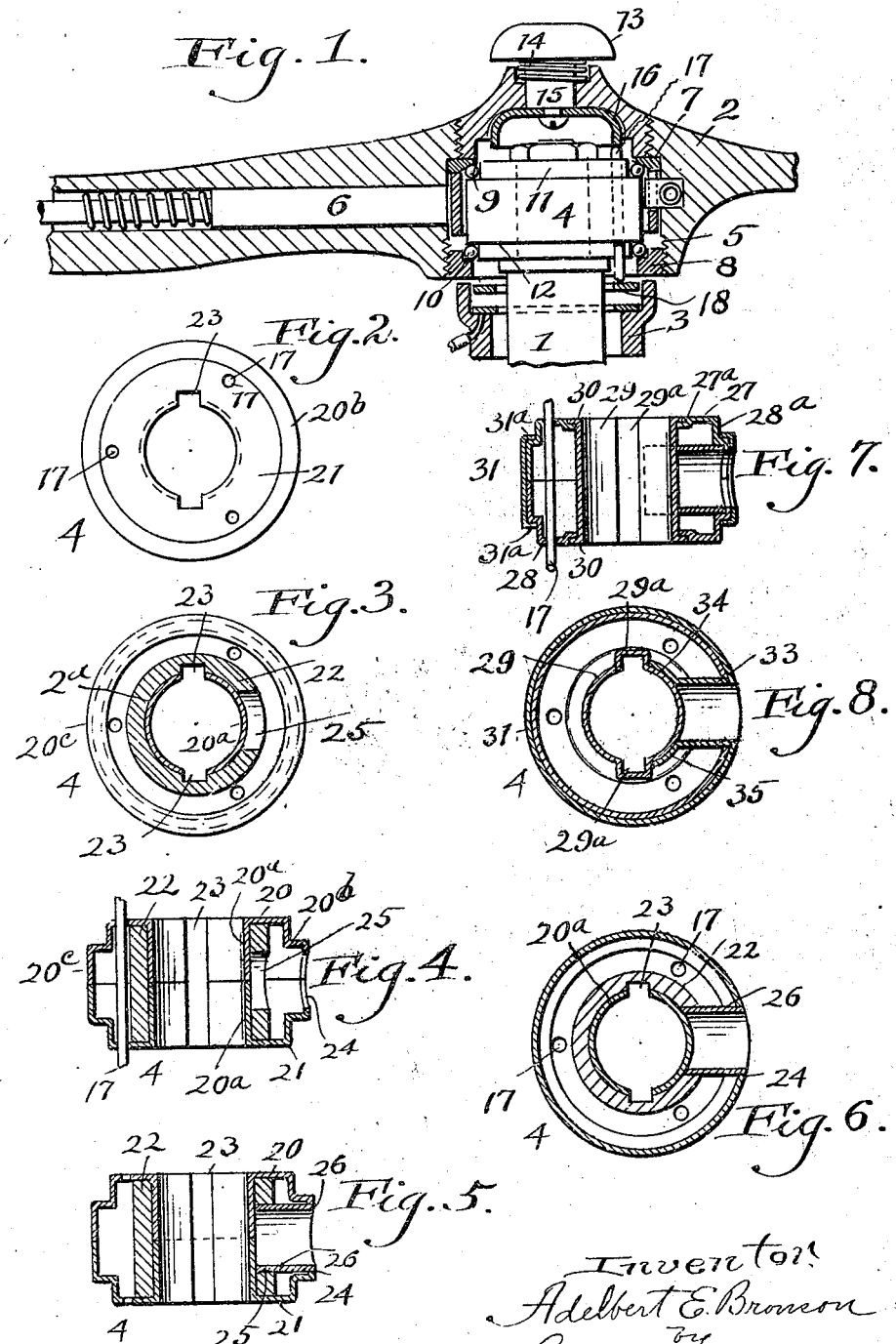

1,512,396

UNITED STATES PATENT OFFICE.

ADELBERT E. BRONSON, OF CLEVELAND, OHIO.

HUB FOR STEERING WHEELS.

Application filed November 10, 1922. Serial No. 600,008.

*To all whom it may concern:*

Be it known that I, ADELBERT E. BRONSON, a citizen of the United States, residing at Cleveland, in the county of Cuyahoga and State of Ohio, have invented a certain new and useful Improvement in Hubs for Steering Wheels, of which the following is a full, clear, and exact description.

The present invention relates to what may be termed a hub construction which is particularly intended for use in connection with locking steering wheels, and is adapted to be secured at the upper end of a steering shaft, the hub forming a support for the steering wheel proper, and also co-operating with a locking mechanism by which the steering wheel may be fastened to the steering shaft or disconnected therefrom at will.

Reference should be had to the accompanying drawings forming a part of this specification, in which Fig. 1 is a sectional elevation of a portion of a steering wheel mounted upon a steering shaft with the shaft and hub in elevation. Fig. 2 is a top plan view of a hub; Fig. 3 is a longitudinal section of a hub shown in Fig. 2. Fig. 4 is a vertical section of a hub shown in Figs. 2 and 3. Fig. 5 is a vertical section of a hub of modified construction; Fig. 6 is a transverse section of a hub shown in Fig. 5; Fig. 7 is a vertical section of a hub of modified construction; Fig. 8 is a transverse section of a hub shown in Fig. 7.

For the purpose of explaining the present invention, reference will be made to the use of this hub in connection with a specific construction, but it will be understood that the hub may be used in connection with other constructions which will differ in their details from that shown and described.

Referring to the drawings, 1 indicates a turning shaft which is adapted to be turned by the wheel 2. Surrounding the shaft is a usual stationary casing 3. At the upper end of the shaft 1 is secured the hub 4, the construction of which forms the subject matter of this application. The steering wheel, 2, has a recess 5 in which is located a locking mechanism which need not be particularly described because it forms no part of this application. However, reference will be made to the fact that there is a bolt 6 which forms a part of the locking mechanism.

Within the recess 5 of the steering wheel there is a ball bearing ring 7 which is at one end of the recess, and there is also a ball bearing ring 8 which is at the opposite end of the recess. Associated with these rings are ball bearings such as indicated at 9 and 10, and these balls in turn co-operate with raceways 11 and 12 which are formed upon the outer surface of the hub member.

Within the hub member 4 there is a recess which will be later described, into which the bolt 6 may extend, and when the bolt does so extend then the steering wheel is connected with the steering rod 1, and conversely when the bolt 6 is withdrawn then the steering wheel may turn idly upon the ball bearings 9 and 10.

It is desirable to have a horn button associated with the steering wheel, and such a horn button is shown at 13, this being spring pressed by a spring 14 which normally urges the button outwardly. Connected with the button is a shank 15 which at its lower end is secured to a cup-shaped member 16. Extending through suitable openings formed in the hub member are a plurality of pins one of which is indicated at 17. The edge of the cup-shaped member 16 bears upon these pins so that when the button 13 is depressed the pins are also depressed. The pins 17 at their lower ends contact with a spring pressed switch mechanism which may generally be represented at 18, which switch mechanism controls the circuit for the signal horn.

As before stated, the particular subject matter of this invention relates to the construction of the hub member 4, and in Figs. 2, 3 and 4 there is shown one form of such hub construction.

Referring to these figures, 20 represents a cup-shaped member, and 21 represents another cup-shaped member which is a duplicate of the cup-shaped member 20. Each cup-shaped member such as described has an inwardly extending cylindrical wall 20ª and has upon its outer surface a shouldered portion 20ᵇ which serves as a bearing raceway which will be evident by referring to Fig. 2. Each cup-shaped member is also formed to have a marginal flange 20ᶜ, and when the cup-shaped members are assembled the marginal flanges are in contact at the edges thereof.

Each of the cup members which have been described may be conveniently formed from sheet metal of suitable gauge, and as a means for securing them together a ring member 22 may be used which is of an internal diameter that is slightly less than the external diameter of the inwardly extending flange $20^a$, so that when the ring 22 is forced over the inwardly extending flange $20^a$, it will compress the metal of the flange $20^a$ so that the two parts will, after being forced together, remain in their connected condition due to the frictional holding of the one to the other. Similarly the ring 22 may be assembled with respect to the cup 21 so that in the finished article the ring 22 serves as the connecting means between the cup members 20, 21, and also serves as a stiffening member.

As will be well understood, the depth dimension of the flanges which form the cups 20, 21, is regulated so that the edges of the flanges of these members will meet in edge engagement when the ring member 22 is in engagement with the inside bottom walls of the cup-shaped members.

After the assembly of the cup-shaped members and the ring 22 as described there are one or more grooves, such as represented at 23, milled in a longitudinal direction, cutting through the inwardly extending flange $20^a$ of the cup-shaped members, and into the ring 22. These grooves 23 serve as keyways by which the hub is mounted at the end of the steering shaft, so as to rotatively connect the hub with the steering shaft.

In the side portion of the assembled cup-shaped members before described there is an opening 24 which opening may be formed either after the cups are assembled by a drilling operation, or each half of the opening 24 may be formed in each of the cup-shaped members before assembly. This opening 24 is in alignment with an opening 25, which is formed in the ring 22, and when the hub member is positioned upon the steering shaft 1 the position of the openings 24, 25, will be such that the bolt 6 may pass through and engage in these openings for the purpose of connecting the wheel proper with the hub. In this connection it will be noted that the driving force by which the steering wheel turns the steering shaft 1 is really through the ring member 22, and that the cup-shaped members in reality form the ball races by which the steering wheel is supported, and also form a carrier and guide for the pins 17 which are used in the operation of the horn button.

In the construction which is shown in Fig. 5 the same elements are employed, that is to say, the two cup-shaped members which are formed in precisely the same manner as indicated in Fig. 4 are assembled on a ring 22. The difference in construction lies in the fact that a tubular member 26 is inserted in the opening 24, and also extends into the opening 25 which is formed in the ring member 22, this tubular member 26 serving as a guide to guide the bolt into engagement with the ring 22.

In Figs. 7 and 8 there is shown a further modification of the structure in which the two cup-shaped members are connected together by means of an internal and external fastening means, rather than a ring member like the ring 22 which has been previously described.

Referring to Figs. 7 and 8 there are cup-shaped members 27 and 28 which are formed precisely alike. In each of the cup-shaped members there is a depressed central portion such as represented at $27^a$, which will be later described, and there is also a shouldered portion, such as 28, which is adapted to serve as a ball race in precisely the same manner as the shoulder $20^b$ in the structure which has been previously described.

The cup-shaped members 27 and 28 may be assembled with their edge or rim in engagement, and for the purpose of holding them in this position there is an internal sleeve or bushing 29 which at its outer edges is provided with outturned flanges 30, these flanges being turned to occupy the groove $27^a$ which is formed in the cup-shaped members, and these members are assembled in such a manner that the connection between the member 29 and the cup-shaped members permits of no relative movement. There is an annular band-like member 31 which engages with the central portion of the assembled cup members 27, 28, and to hold this band member in place the edges, such as at $31^a$, are bent over to engage with a portion of the shoulders 28. Therefore, the band 31 and the thimble 29 hold the cup-shaped members in their assembled position and against movement. The member 29 may be conveniently formed as a stamping, and when this is done one or more keyways, such as indicated at $29^a$, may be directly formed in the member 29 when it is initially formed up. At the side of the assembled cup-shaped members which have been described there is an opening, and extending just through this opening is a cylindrical member 33, and at the inner end of this member there are extending portions 34 and 35 which are formed to correspond with the outer surface of the member 29, and the extreme edges of these members 34, 35, bear against the side walls of the formed keyways slots $29^a$. This member 33 is secured in its position in any desired manner.

When the bolt 6 moves into the member 33 and the wheel is turned to transmit the turning force of the wheel to the steering post, the side thrust incident to the operation described is transferred through the sleeve 33, and its members 34, 35, to the bushing 29, which is keyed to the steering shaft 1 by suitable keys which occupy the grooves 29ª.

Having described my invention, I claim:—

1. A hub comprising two cup-shaped members having their marginal flanges in contact thereby forming a hollow hub, means for securing said cup-shaped members together the said hub having a circumferential bearing shoulder formed upon its outer surface.

2. A hub comprising two cup-shaped members having their marginal flanges in contact thereby forming a hollow hub, means for securing said cup-shaped members together, the hub having a bearing portion formed upon its outer surface and said hub having an opening in its side for the purpose described.

3. A hub comprising two cup-shaped members having their marginal flanges in contact thereby forming a hollow hub, each of said members having aligned axial openings which have marginal flanges, the latter flanges of the two members being in contact, and a cylindrical member which aligns with said opening and co-operating with said last-mentioned flanges to hold them together.

4. A hub comprising two cup-shaped members having their marginal flanges in contact thereby forming a hollow hub, each of said members having an axial opening which openings are in alignment, and a cylindrical member which aligns with said opening and co-operating with said members to hold them together, said cylindrical member being formed with a keyway upon its inner surface.

5. A hub comprising two cup-shaped members having their marginal flanges in contact thereby forming a hollow hub, means holding the said members together said hub having an opening in the side thereof, and a tubular member extending through said opening.

6. A hub comprising two cup-shaped members having their marginal flanges in contact thereby forming a hollow hub, each of said members having an axial opening, a cylindrical member which aligns with said opening and co-operating with the said members to hold them together, said hub having an opening in the side thereof, and a tubular member extending through said opening.

7. A hub comprising two cup-shaped members having their marginal flanges in contact, and a cylindrical member within said hub, the cup-shaped members having portions which are forced upon said ring-shaped member which thereby forms a means for uniting the cup-shaped members and a strengthening member, the cup-shaped members having bearing portions formed upon their outer surfaces.

8. A hub comprising two cup-shaped members having their marginal flanges in contact thereby forming a hollow hub, each of said cup-shaped members having inwardly extending cylindrical portions, a ring-like member which is forced into contact with a surface of the said cylindrical extensions whereby the cup-shaped members are held together and strengthened, the hub thus formed having a bearing portion upon its upper surface and said hub at one side thereof being formed with an opening, and the said ring member being formed with an opening which aligns with the opening in the side of the hub.

9. A hub comprising two cup-shaped members having their marginal flanges in contact thereby forming a hollow hub, each of said cup-shaped members having inwardly extending cylindrical portions, a ring-like member which is forced into contact with a surface of the said cylindrical extensions whereby the cup-shaped members are held together and strengthened, the hub thus formed having a bearing portion upon its upper surface and said hub at one side thereof being formed with an opening, and the said ring member being formed with an opening which aligns with the opening in the side of the hub, and a tubular member extending through the opening in the side of the hub and into the opening in the ring member.

In testimony whereof, I hereunto affix my signature.

ADELBERT E. BRONSON.